Patented June 21, 1938

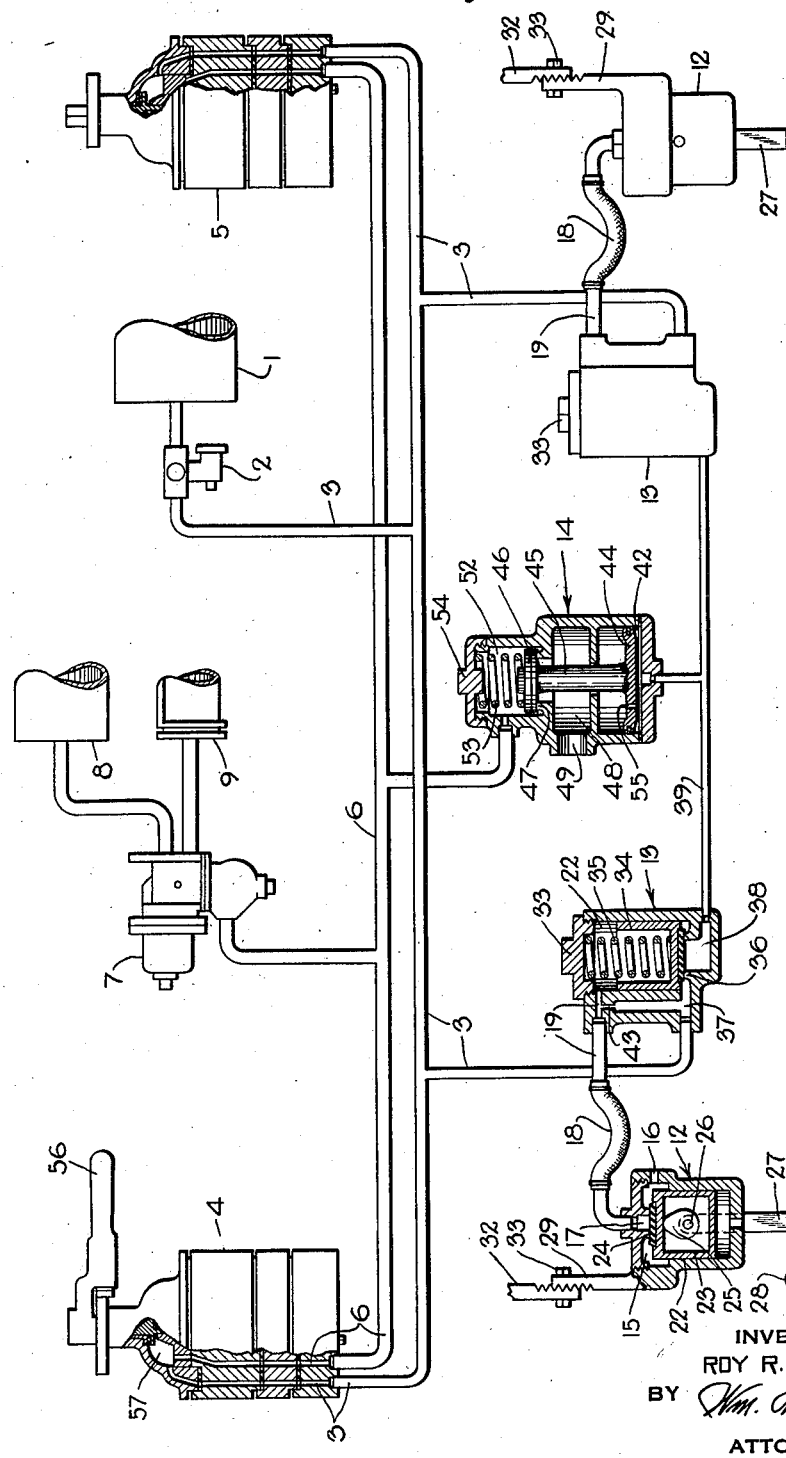

2,121,552

UNITED STATES PATENT OFFICE 2,121,552

TRIP CONTROLLED BRAKE

Roy R. Stevens, Forest Hills, Pa., assignor to The Westinghouse Air Brake Company, Wilmerding, Pa., a corporation of Pennsylvania Application September 4, 1936, Serial No. 99,444

4 Claims. (Cl. 246—190)

My invention relates to brake equipment for vehicles and more particularly to a trip controlled brake equipment for automatically applying the brakes should the vehicle pass a road bed trip that has been set against train movement.

Trip cocks have been employed that are directly connected to branch pipes communicating with the brake pipe for the purpose of venting the brake pipe when the train passes a road bed trip that has been set against train movement, but these prior art trip cocks are so located on the car as to require a considerable length of pipe between them and the brake pipe, thus increasing the brake pipe volume by a considerable amount. The increased brake pipe volume requires the use of a larger amount of air in effecting an application of the brakes than would otherwise be required. In some cases the brake pipe volume has been sufficient to prevent an emergency rate of reduction in brake pipe pressure upon operation of the trip cock, if the brake valve device happens to be in release position.

It is an object of my invention to provide a brake equipment having an emergency trip mechanism that does not require the brake pipe volume to be appreciably increased, and that is positive and prompt in its operation to effect an emergency application of the brakes at all times.

Other objects and advantages of my invention will be apparent from the following description of one preferred embodiment thereof, reference being had to the accompanying drawing in which the single figure illustrates a brake equipment organized in accordance with my invention.

Referring to the drawing, the single figure illustrates a brake equipment having a main reservoir 1 from which fluid under pressure is supplied at a reduced pressure by the feed valve device 2, to a feed valve pipe 3, and from said feed valve pipe through either a brake valve device 4 or a brake valve device 5 at opposite ends of the car to the brake pipe 6. An automatic valve device 7 is provided that is connected to the brake pipe 6, and to an auxiliary reservoir 8 and a brake cylinder 9, for effecting the supply of fluid under pressure from the auxiliary reservoir to the brake cylinder upon a reduction in brake pipe pressure in a well known manner.

Trip cocks 12 are provided that are mounted on the car trucks at diagonally opposite corners of the car and that are associated, respectively, with application valve devices 13, either of which is adapted to control a relay valve device 14 to effect a reduction in brake pipe pressure at an emergency rate upon operation of the associated trip cock device 12.

The trip cock device 12 comprises a casing providing a chamber 15 that is in communication with the atmosphere through an exhaust port 16, and a chamber 17 that is in communication through a flexible hose 18 and a pipe and passage 19 with a spring chamber 22 of an application valve device 13. A bore within the casing of the trip cock device 12 provides accommodation for a valve piston 23 that is adapted to engage the rib seat 24 surrounding the chamber 17 to close communication between the chambers 17 and 15. The valve piston 23 is normally held in its illustrated position by a cam 25 mounted on a pin 26 and connected to a lever 27 that is adapted to engage the road bed trip 28 when the road bed trip is in its illustrated or raised position on the road bed. The trip cock device 12 is provided with an upwardly extending bracket 20 arm 29 that may be attached to a bracket 32 mounted on the car truck by any suitable means, such as by the bolt 33, at a convenient elevation so that the lever 27 will engage the road bed trip 28 when in its raised position.

The application valve device 13 provides the aforenamed spring chamber 22, the outer end of which is closed by a cap nut 33, and which contains a valve piston 34 that is urged to its illustrated position by a spring 35 within the chamber 22, one end of which engages the nut 33 and the other end of which engages the valve piston 34 to force the piston 34 against a rib seat 36 to close communication between a chamber 37 that is in constant communication with the feed valve pipe 3, and a chamber 38, that is in constant communication through pipe 39 with a piston chamber 42 contained within the emergency relay valve device 14. The chamber 37 is connected through a restricted port 43 and passage 19 with the spring chamber 22, thus supplying fluid under pressure at feed valve pipe pressure to the chamber 22 and to the chamber 17 of the trip cock device 12.

The emergency relay valve device 14 comprises a casing providing the aforenamed piston chamber 42 containing a piston 44 that is connected by a stem 45 to a valve 46 that is adapted to engage a rib seat 47 to close communication between a chamber 48 that is in open communication with the atmosphere through exhaust port 49, and a chamber 52 that is in constant open communication with the brake pipe 6. A spring 53 is provided within the chamber 52, the upper end of which engages a cap nut 54, closing the upper end of chamber 52, and the lower end of which engages the valve 46 to urge it to its rib seat 47. A restricted port 55 is provided in the piston 44 to effect a restricted communication between the chamber 42 and the atmosphere through chamber 48.

In order to charge the system the handle 56 of one of the brake valve devices 4 or 5 must be in its running position. While the system is being charged fluid under pressure flows from the feed valve pipe 3 and passage 3 through brake valve chamber 57 to brake passage and pipe 6 to charge the chamber 52 of the emergency relay valve device 14, and to charge the auxiliary reservoir 8 through the automatic valve device 7 in a well known manner. Fluid under pressure also flows from feed valve pipe 3 to the chamber 37 in the application valve devices 13 and through the restricted ports 43 to the spring chambers 22, and through passages and pipes 19 and hoses 18 to the chambers 17 of the trip cock devices 12.

When it is desired, for any reason, to restrict train movement over a given portion of track, the road bed trip 28 controlling that track section is raised to its illustrated position, that is to an elevation such that one of the levers 27 will engage the trip should the vehicle pass over the restricted point.

Upon passage of the vehicle over the restricted point when the road bed trip 28 is in its illustrated position, the lever 27 associated with one of the application valve devices 13 will engage the trip 28 and be moved from its vertical position to relieve the pressure between the cam 25 and the valve piston 23 to permit the valve piston to be forced downwardly by the fluid under pressure in the chamber 17, thus effecting communication from the spring chamber 22 of the application valve device 13 to the atmosphere through passage and pipe 19, hose coupling 18, chambers 17 and 15 of the trip cock device 12 and exhaust port 16. Fluid under pressure is thus vented from the spring chamber 22 on upper side of the valve piston 34 of the application valve device 13, and feed valve pipe pressure within the chamber 37 acting on the outer rim of the valve piston 34 is sufficient to overcome the downward pressure of the spring 35 and raise the valve piston 34 from its rib seat 36 and effect communication from the feed valve pipe 3 to the piston chamber 42 of the emergency relay valve device 14 through chambers 37 and 38 and pipe 39.

Upon the supply of fluid under pressure to the piston chamber 42 of the emergency relay valve device 14, the piston 44 and the valve 46 are moved upwardly against the pressure of the spring 53 to raise the valve 46 from its rib seat 47 to effect communication to the atmosphere from the brake pipe 6 through chambers 52 and 48, to vent the brake pipe at an emergency rate to effect an emergency application of the brakes in a well known manner.

It will be noted that by mounting the trip cock devices 12 at the ends of the car on the truck, and mounting the application valve devices 13 and the emergency relay valve device 14 on the car body, it is necessary to have only a very short branch pipe from the brake pipe 6 to the relay valve device 14 so that the brake pipe volume will not be increased materially by the addition of the trip controlled brake mechanism, and that the capacity of the emergency relay valve device 14 may easily be made such as to vent the brake pipe 6 at an emergency rate under all conditions of the brake equipment.

It will be apparent to one skilled in the art that many modifications in the apparatus illustrated and described may be made within the spirit of my invention, and I do not wish to be limited otherwise than by the scope of the appended claims.

Having now described my invention, what I claim as new and desire to secure by Letters Patent, is:

1. In a fluid pressure brake equipment for a vehicle, in combination, a brake pipe normally charged with fluid under pressure, a fluid pressure supply pipe, means operated upon a sudden reduction in brake pipe pressure for effecting an emergency application of the brakes, an emergency valve device operated upon an increase in fluid pressure for effecting a sudden reduction in brake pipe pressure, an application valve device operable upon a reduction in fluid pressure for supplying fluid under pressure from said supply pipe to said emergency valve device, and a trip cock adapted to be actuated by means associated with the track on which the vehicle is operated for venting fluid under pressure from said application valve device.

2. In a fluid pressure brake equipment for a vehicle, in combination, a brake pipe, valve means operated on a reduction in brake pipe pressure to effect an application of the brakes, an emergency valve device operative on the supply of fluid under pressure to vent fluid from the brake pipe, application valve means subject to the opposing pressures of the fluid in a supply pipe and of the fluid in a chamber and operated on a reduction in the pressure of the fluid in said chamber to supply fluid from said supply pipe to said emergency valve device, means for supplying fluid from the supply pipe to said chamber at a restricted rate, and a trip cock adapted to be operated by means associated with the track on which the vehicle is operated for venting fluid from said chamber at a rapid rate.

3. In a fluid pressure brake equipment for a vehicle, in combination, a brake pipe, valve means operated on a reduction in brake pipe pressure to effect an application of the brakes, an emergency valve device operative on the supply of fluid under pressure to vent fluid from the brake pipe, application valve means subject to the opposing pressures of the fluid in a supply pipe and of the fluid in a chamber and operated on a reduction in the pressure of the fluid in said chamber to supply fluid from said supply pipe to said emergency valve device, means for supplying fluid from the supply pipe to said chamber at a restricted rate, a trip cock adapted to be operated by means associated with the track on which the vehicle is operated for venting fluid from said chamber at a rapid rate, and means for releasing fluid from said emergency valve device at a restricted rate.

4. In a fluid pressure brake equipment for a vehicle, a brake pipe mounted on the vehicle, valve means operated on a reduction in brake pipe pressure to effect an application of the brakes, an emergency valve device operative on the supply of fluid thereto to vent fluid from the brake pipe, the emergency valve device being mounted on the vehicle at a point adjacent the brake pipe whereby the volume of the brake pipe is not materially increased by the connection of the emergency valve device therewith, a supply pipe adapted to be normally charged with fluid under pressure, application valve means subject to the opposing pressures of the fluid in the supply pipe and of the fluid in a chamber and operated on a reduction in the pressure of the fluid in said chamber to supply fluid from the supply pipe to said emergency valve device, means for supplying fluid at a restricted rate from said supply pipe to said chamber, and a trip cock for venting fluid from said chamber at a rapid rate, said trip cock being mounted on the vehicle at a point a substantial distance from the brake pipe and being adapted to be operated by means associated with the track on which the vehicle is operated.

ROY R. STEVENS.